United States Patent
Han et al.

(10) Patent No.: US 10,466,834 B2
(45) Date of Patent: Nov. 5, 2019

(54) TOUCH SYSTEM FOR FINGER AND STYLUS PEN TOUCH RECOGNITION

(71) Applicants: Leading UI Co., Ltd., Gyeonggi-do (KR); Sang-Hyun Han, Gyeonggi-do (KR)

(72) Inventors: Sang-Hyun Han, Gyeonggi-do (KR); Han-Hee Hong, Gyeonggi-do (KR)

(73) Assignees: LEADING UI CO., LTD., Anyang-si, Gyeonggi-Do (KR); San-Hyun Han, Anyang-si, Gyeonggi-Do (KR)

( * ) Notice: Subject to any disclaimer, the term of this patent is extended or adjusted under 35 U.S.C. 154(b) by 88 days.

(21) Appl. No.: 15/595,140

(22) Filed: May 15, 2017

(65) Prior Publication Data

US 2018/0329563 A1    Nov. 15, 2018

(51) Int. Cl.
*G06F 3/041* (2006.01)
*G06F 3/0354* (2013.01)
*G06F 3/044* (2006.01)

(52) U.S. Cl.
CPC ........ *G06F 3/0416* (2013.01); *G06F 3/03545* (2013.01); *G06F 3/044* (2013.01); *G06F 2203/04104* (2013.01)

(58) Field of Classification Search
CPC ....... G06F 2203/04104; G06F 3/03545; G06F 3/0416
See application file for complete search history.

(56) References Cited

U.S. PATENT DOCUMENTS

| | | | |
|---|---|---|---|
| 2009/0009483 A1* | 1/2009 | Hotelling | G06F 3/0416 345/173 |
| 2014/0327644 A1* | 11/2014 | Mohindra | G06F 3/044 345/174 |
| 2015/0109218 A1* | 4/2015 | Satou | G06F 3/0488 345/173 |
| 2017/0185183 A1* | 6/2017 | Sundararajan | G06F 3/044 |
| 2018/0081492 A1* | 3/2018 | Kim | G06F 3/03545 |
| 2018/0267635 A1* | 9/2018 | Shida | G06F 3/03545 |

* cited by examiner

*Primary Examiner* — Chun-Nan Lin
(74) *Attorney, Agent, or Firm* — Hauptman Ham, LLP

(57) ABSTRACT

A touch system includes a touch panel, a stylus pen and a touch sensing controller. The touch panel includes a plurality of driving electrodes and a plurality of sensing electrodes. The stylus pen provides the touch panel with a pen frequency signal set for detecting a position of a stylus pen and a pressure of the stylus pen. The touch sensing controller outputs a plurality of driving signals having different frequency components to the touch panel and determines at least one of touch coordinates of a finger and touch coordinates of the stylus pen based on a plurality of sensing signals received from the touch panel.

7 Claims, 17 Drawing Sheets

FIG. 9B
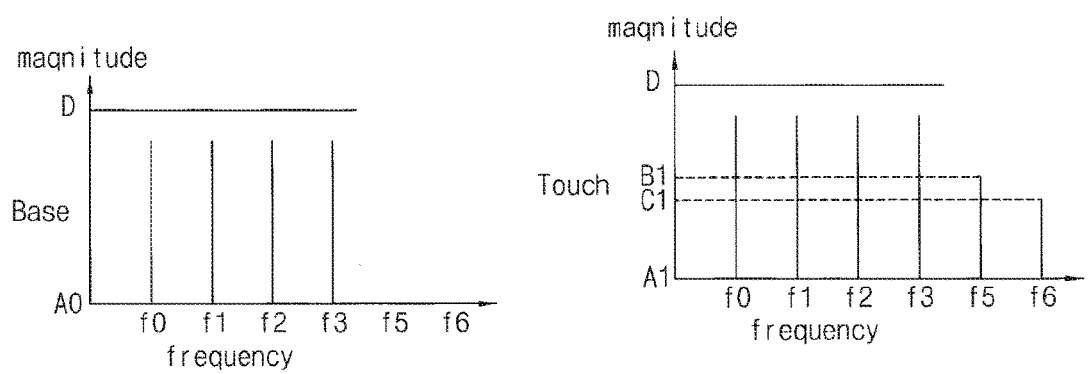
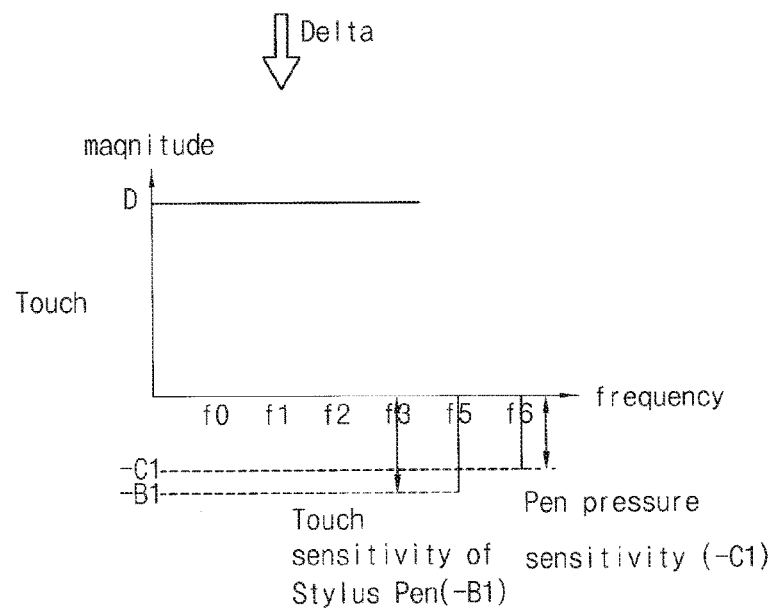

TOUCH SYSTEM FOR FINGER AND STYLUS PEN TOUCH RECOGNITION

BACKGROUND OF THE INVENTION

Technical Field

Exemplary embodiments of the present invention relate to a touch system and a touch sensing controller and a stylus pen employed in the touch system. More particularly, the present invention relates to a touch system capable of simultaneously realizing finger touch recognition and pen touch recognition and capable of realizing multitouch recognition of stylus pens, and a touch sensing controller and a stylus pen employed in the touch system.

Discussion of the Related Art

The use of touch screen interfaces and styluses has been widely established. Touch screen designs have incorporated many different technologies including resistive, capacitive, inductive, and radio frequency sensing arrays. For example, resistive touch screens are passive devices well suited for use with a passive stylus.

Although resistive touch screens can sense the input from nearly any object, multi-touch is generally not supported. An example of a multi-touch application may be applying two or more fingers to the touch screen. Another example may be inputting a signature, which may include simultaneous palm and stylus input signals. Due to these and other numerous disadvantages, capacitive touch screens are increasingly replacing resistive touch screens in the consumer marketplace.

Various tethered active stylus approaches have been implemented for use with touch screens and are found in many consumer applications such as point-of-sale terminals (e.g., the signature pad used for credit card transactions in retail stores) and other public uses. However, the need for a tethered cable is a significant drawback for private applications such as personal computers ("PCs"), smart phones, and tablet PCs.

SUMMARY

Exemplary embodiments of the present invention provide a touch system capable of simultaneously realizing finger touch recognition and pen touch recognition, and realizing multi-touch recognition of stylus pens.

Exemplary embodiments of the present invention also provide a touch sensing controller employed in the above-mentioned touch system.

Exemplary embodiments of the present invention further also provide a stylus pen employed in the above-mentioned touch system.

According to one aspect of the present invention, a touch system includes a touch panel, a stylus pen and a touch sensing controller. The touch panel includes a plurality of driving electrodes and a plurality of sensing electrodes. The stylus pen provides the touch panel with a pen frequency signal set for detecting a position of a stylus pen and a pressure of the stylus pen. The touch sensing controller outputs a plurality of driving signals having different frequency components to the touch panel and determines at least one of touch coordinates of a finger and touch coordinates of the stylus pen based on a plurality of sensing signals received from the touch panel.

In an exemplary embodiment, the pen frequency signal may be a mixture of a position sensing signal set for sensing a position of the stylus pen and a pressure sensing signal set for sensing a pressure of the stylus pen.

In an exemplary embodiment, the position sensing signal and the driving signal may have different frequency components.

In an exemplary embodiment, the pressure sensing signal and the driving signal may have different frequency components.

In an exemplary embodiment, the touch sensing controller may includes a touch driving unit, a touch sensing unit and a touch determining unit. The touch driving unit is connected to the driving electrodes to output the driving signals to the driving electrodes. The touch sensing unit is connected to the sensing electrodes to receive the sensing signals through the sensing electrodes. The touch determining unit determines touch coordinates based on the sensing signals received through the touch sensing unit.

In an exemplary embodiment, the touch driving unit may include a transmission signal generating part and a transmission multiplexing part. The transmission signal generating part includes a plurality of transmission signal generators generating different driving signals. The transmission multiplexing part includes a plurality of transmission multiplexers having a first transmission input terminal connected to the transmission signal generator, a second transmission input terminal connected to the touch sensing unit, and an output terminal connected to the driving electrode. The first transmission input terminal is connected to the transmission output terminal or the second transmission input terminal is connected to the output terminal in response to a multiplexer control signal provided from an external device.

In an exemplary embodiment, the touch sensing unit may includes a reception multiplexing part, a reception sensing part, an analog-to-digital converting part and a fast Fourier transform part. The reception multiplexing part includes a plurality of reception multiplexers having a reception output terminal, a first reception input terminal connected to the sensing electrode and a second reception input terminal connected to a second transmission input terminal of a transmission multiplexing part of the touch driving unit. The first reception input terminal is connected to the reception output terminal or the second reception input terminal is connected to the reception output terminal in response to the multiplexer control signal. The reception sensing part includes a plurality of reception sensors connected to a reception output terminal of the reception multiplexers. The analog-to-digital converting part digitally converts sensing signals received through the reception sensors. The fast Fourier transform part Fourier-transforms the sensing signal digitally converted by the analog-to-digital conversion part.

In an exemplary embodiment, in response to the multiplexer control signal, first input terminals of the transmission multiplexers and the driving electrodes are connected to each other, and first input terminals of the reception multiplexers and the receive sensing part are connected to each other, so that touch coordinates of the finger, a first axis coordinates of the stylus pen and a pen pressure information of the stylus pen are sensed.

In an exemplary embodiment, in response to the multiplexer control signal, second input terminals of the transmission multiplexers and the driving electrodes are connected to each other, and second input terminals of the reception multiplexers and the receive sensing part are connected to each other, so that a second axis coordinate of the stylus pen and a pen pressure information of the stylus pen are sensed.

In an exemplary embodiment, the driving signal may be simultaneously output to the touch panel.

According to another aspect of the present invention, a touch sensing controller includes a touch driving unit, a touch sensing unit and a touch determining unit. The touch driving unit is connected to driving electrodes of a touch panel contacting with a stylus pen that outputs a pen frequency signal set to detect a position of the stylus pen and a pressure of the stylus pen. The touch driving unit outputs the driving signals to the driving electrodes. The touch sensing unit is connected to sensing electrodes of the touch panel to receive the sensing signals through the sensing electrodes. The touch determining unit determines at least one of touch coordinates of a finger and touch coordinates of the stylus pen based on the sensing signals.

In an exemplary embodiment, the touch driving unit may include a transmission signal generating part and a transmission multiplexing part. The transmission signal generating part includes a plurality of transmission signal generators that generates driving signals having different frequency components. The transmission multiplexing part includes a plurality of transmission multiplexers having a first transmission input terminal connected to the transmission signal generator, a second transmission input terminal connected to the touch sensing unit, and a transmission output terminal connected to the driving electrode. The first transmission input terminal and the transmission output terminal are connected to each other or the second transmission input terminal and the transmission output terminal are connected to each other, in response to a multiplexer control signal provided from an external device.

In an exemplary embodiment, the touch sensing unit may includes a reception multiplexing part, a reception sensing part, an analog-to-digital converting part and a fast Fourier transform part. The reception multiplexing part includes a plurality of reception multiplexers having a reception output terminal, a first reception input terminal connected to the sensing electrode and a second reception input terminal connected to a second transmission input terminal of the transmission multiplexing part of the touch driving unit. The first reception input terminal and the reception output terminal are connected to each other or the second reception input terminal and the receiving output terminal are connected to each other, in response to the multiplexer control signal. The reception sensing part includes a plurality of reception sensors connected to a reception output terminal of the reception multiplexers. The analog-to-digital converting part digitally converts the sensing signals received through the reception sensors. The fast Fourier transform part Fourier-transforms the sensing signal digitally converted by the analog-to-digital converting part.

In an exemplary embodiment, in response to the multiplexer control signal, first input terminals of the transmission multiplexers and the driving electrodes may be connected to each other, and first input terminals of the reception multiplexers and the receive sensing part may be connected to each other, so that a touch coordinate of the finger, a first axis coordinate of the stylus pen, and a pressure information of the stylus pen are sensed.

In an exemplary embodiment, in response to the multiplexer control signal, second input terminals of the transmission multiplexers and the driving electrodes may be connected to each other, and second input terminals of the reception multiplexers and the receive sensing part may be connected to each other, so that a second axis coordinate of the stylus pen and a pressure information of the stylus pen are sensed.

According to another aspect of the present invention, a stylus pen includes a conductive tip, a pressure sensor, a frequency signal generator and a mixer. The conductive tip is contactable with a touch panel. The pressure sensor measures a pressure of the conductive tip applied to the touch panel and outputting a pen pressure signal. The frequency signal generator generates a pressure sensing signal based on the pen pressure signal and generates a position sensing signal for sensing a position of the stylus pen. The mixer mixes the position sensing signal and the pressure sensing signal to provide a mixing signal to the conductive tip.

In an exemplary embodiment, the pressure sensing signal may have a uniform frequency and varied amplitude in accordance with the pen pressure signal.

In an exemplary embodiment, frequencies of each of the pressure sensing signal and the position sensing signal may be different from a frequency of a driving signal applied to a driving electrode of the touch panel.

According to a touch system and a touch sensing controller and a stylus pen employed therein, the driving signals having different frequency components are output to the touch panel and at least one of the touch coordinates of the finger and the touch coordinates of the stylus pen is determinated based on the sensing signals received at the touch panel, so that the touch recognition may be realized at the same time. Further, in order to sense a position of the stylus pen and a pressure of the stylus pen, the stylus pen is designed to set a frequency of a pen frequency signal different from a frequency of a driving signal applied to the touch panel, so that plural stylus pens may be used in one touch panel.

BRIEF DESCRIPTION OF THE DRAWINGS

The above and other features and aspects of the present invention will become more apparent by describing in detailed exemplary embodiments thereof with reference to the accompanying drawings, in which:

FIG. 9B is a waveform diagram illustrating touch coordinate recognition through frequency spectrum analysis of a sensing signal by a stylus pen;

DETAILED DESCRIPTION OF THE INVENTION

Figure 1:
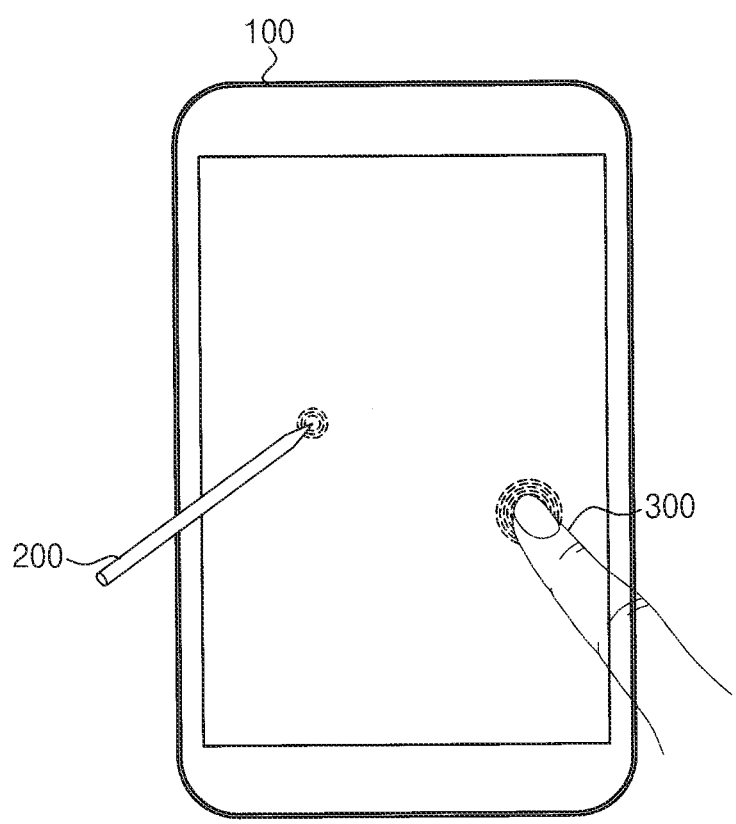
FIG. 1 is a schematic diagram illustrating a touch system according to an exemplary embodiment of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on." "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a schematic diagram illustrating a touch system according to an exemplary embodiment of the present invention. In particular, it is a schematic diagram illustrating the simultaneous use of a stylus pen and a finger on a touch panel.

Referring to FIG. 1, a touch system includes a touch sensing device 100 and a stylus pen 200 to recognize a touch operation of a finger 300 by the user or a touch operation of the stylus pen 200. The touch sensing device 100 detects a position of the finger 300 of the user to determine a touch coordinates of the finger 300 or detects a position of the stylus pen 200 to determine a touch coordinates of the stylus pen 200. A touch coordinates of the finger 300 and a touch coordinates of the stylus pen 200 may be detected at the same time.

Figure 2:
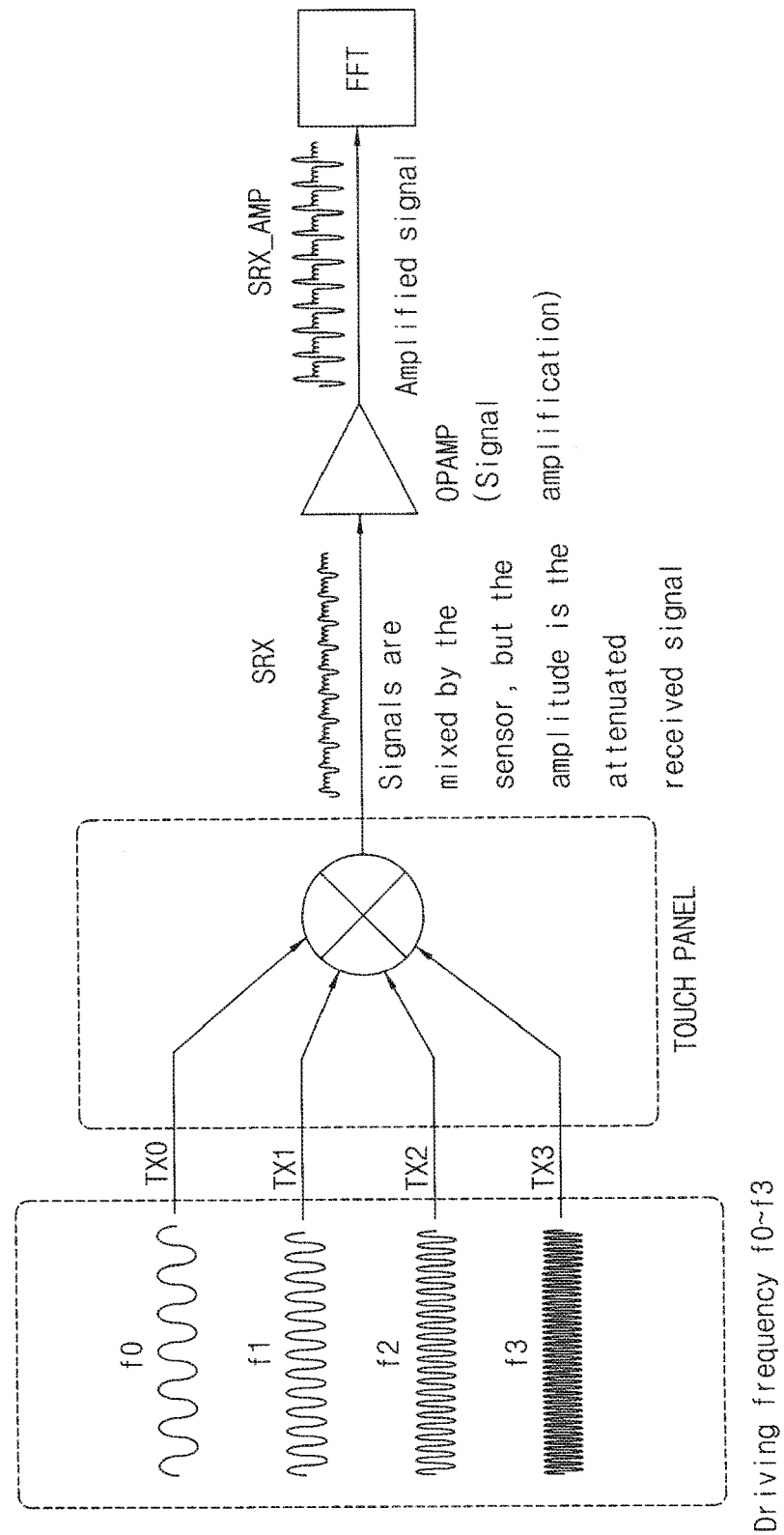
FIG. 2 is a configuration diagram illustrating a touch coordinate determination by a touch sensing device shown in FIG. 1.

FIG. 2 is a configuration diagram illustrating a touch coordinate determination by a touch sensing device shown in FIG. 1.

Referring to FIG. 1 and FIG. 2, a plurality of driving signals is applied to different driving electrodes provided on a touch panel. Each of the driving signals has different frequency components. Hereinafter, for convenience of explanation, it is described that a first driving signal STX0, a second driving signal STX1, a third driving signal STX2 and a fourth driving signal STX3 are applied to the touch panel. Therefore, the first driving signal STX0 has a first frequency component f0, the second driving signal STX1 has a second frequency component f1, and the third driving signal STX2 has a third frequency component f2, and the fourth driving signal STX3 has a fourth frequency component f3. Each of the first to fourth frequency components f0, f1, f2 and f3 is different from each other.

A sensing electrode RX of the touch panel receives sensing signal SRX sensed corresponding to the first to fourth driving signals STX0, STX1, STX2 and STX3. The sensing signal is mixed by the touch panel; however an amplitude of the sensing signal SRX is decreased in comparison to the driving signals STX0, STX1, STX2 and STX3.

The sensing signal SRX is amplified by an amplifier and then supplied to a fast Fourier transform (FFT) processing block. The FFT processed sensing signals are disassembled and interpreted to derive coordinates of where the touch occurred. The amplifier or the FFT processing block may be provided in a touch sensing controller provided in the touch sensing device 100.

Figure 3A:
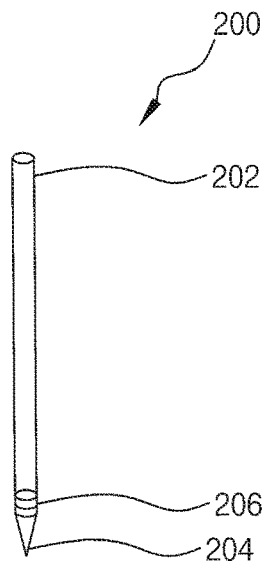
FIG. 3A is a schematic diagram illustrating an appearance of the stylus pen shown in FIG. 1.
Figure 3B:
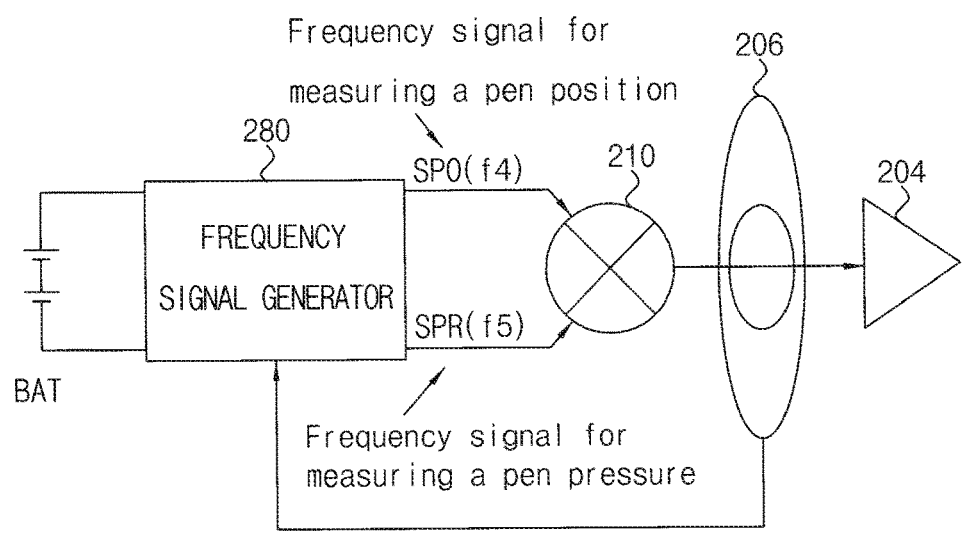
FIG. 3B is a configuration diagram schematically illustrating the stylus pen shown in FIG. 1.

FIG. 3A is a schematic diagram illustrating an appearance of the stylus pen shown in FIG. 1, and FIG. 3B is a configuration diagram schematically illustrating the stylus pen shown in FIG. 1.

FIG. 3A and FIG. 3B, a stylus pen 200 includes a pencil-shaped conductive case 202, a conductive tip 204 connected to one side of the conductive case 202, a pen pressure sensor 206 disposed between the conductive case 202 and the conductive tip 204, a frequency signal generator 208 and a mixer 210.

The conductive tip 204 has a shape that can be brought into contact with the touch panel.

The pen pressure sensor 206 measures a pressure of the conductive tip 204 applied to the touch panel and outputs a pressure signal. That is, the pen pressure sensor 206 generates an electric signal in accordance with a pressure applied to the conductive tip 204 protruding from an end portion of a stylus pen body. For example, the pen pressure sensor 206 generates an electrical signal in accordance with a pressure applied to the conductive tip 204 by a user's writing operation. The conductive tip 204 may be connected to the pen pressure sensor 206 to transmit a pressure generated by the conductive tip 204 to the pen pressure sensor 206.

The frequency signal generator 208 generates a position sensing signal SPO that is set to detect a position of a stylus pen 200 and generates a pressure sensing signal SPR that is set to measure a pressure of a stylus pen based on the pressure signal. Hereinafter, for convenience of description, an example in which four driving electrodes and four sensing electrodes are disposed in the touch panel will be described. In this case, a first driving signal STX0, a second driving signal STX1, a third driving signal STX2 and a fourth driving signal STX3 are applied to the driving electrodes. Accordingly, the first driving signal STX0 has a first frequency component f0, the second driving signal STX1 has a second frequency component f1, the third driving signal STX2 has a third frequency component f1, and the fourth driving signal STX3 has a fourth frequency component t3. Each of the first to fourth frequency components f0, f1, f2 and f3 is different from each other. Moreover, a fifth frequency component f4 of the position sensing signal SPO and a sixth frequency component f5 of the pressure sensing signal SPR are different from the first to fourth frequency components f0, f1, f2 and f3.

The mixer 210 mixes the position sensing signal SPO and the pressure sensing signal SPR to output a mixing signal to the conductive tip 204.

As described above, in order to sense a position of the stylus pen and a pressure of the stylus pen, the stylus pen is designed to set a frequency of a pen frequency signal different from a frequency of a driving signal applied to the touch panel, so that plural stylus pens may be used in one touch panel.

Figure 4:
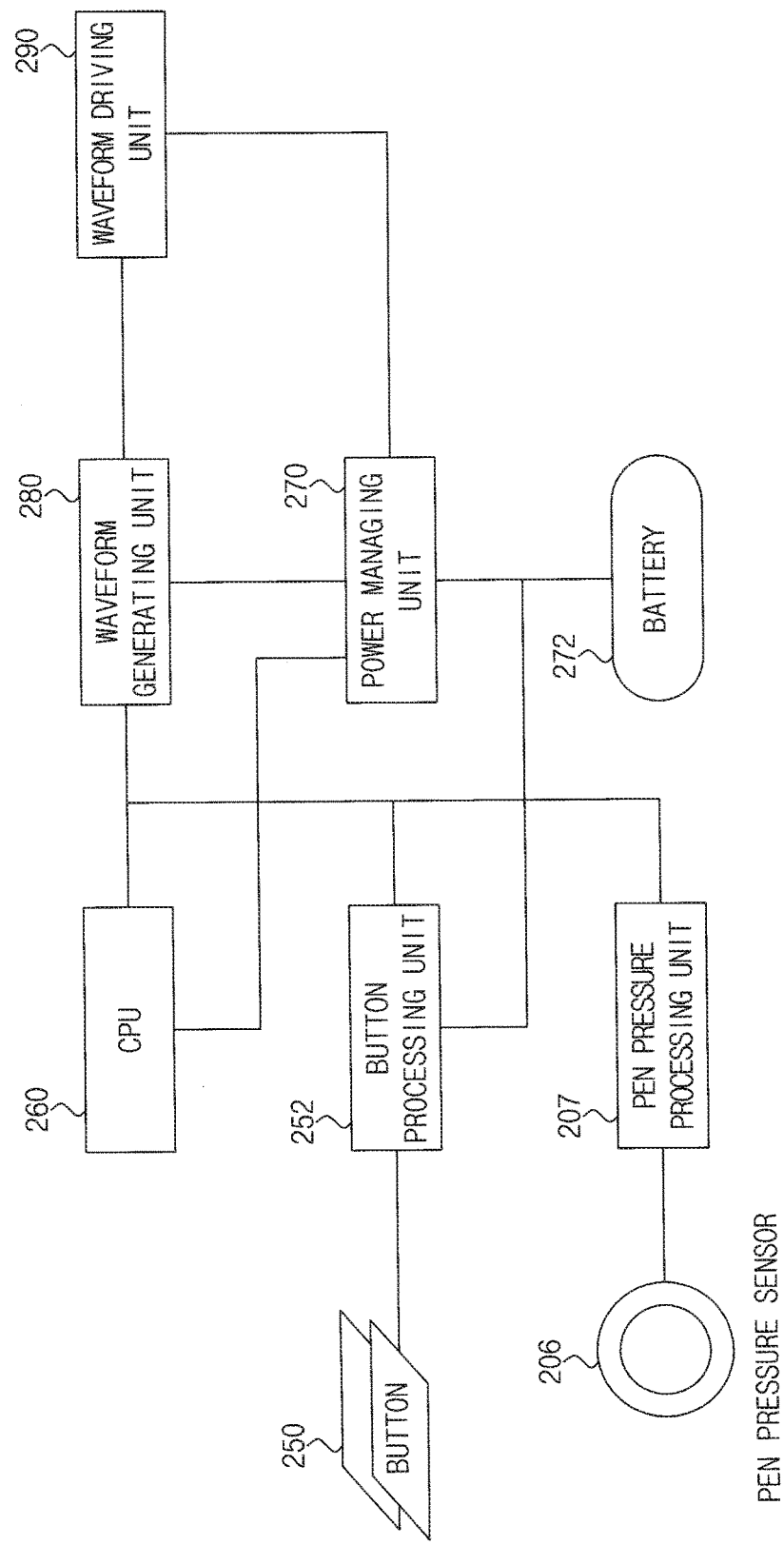
FIG. 4 is a block diagram illustrating the stylus pen shown in FIG. 1.

FIG. 4 is a block diagram illustrating the stylus pen 200 shown in FIG. 1.

Referring to FIG. 4, the stylus pen 200 includes buttons 250, a button processing unit 252, a pen control unit 260, a pen pressure sensor 206, a pen pressure processing unit 207, a pen control unit 260, a power managing unit 270, a battery 272, a waveform generating unit 280 and a waveform driving unit 290.

The buttons 250 are varied according to a user's operation to provide a button signal to the button processing unit 252. The buttons 250 may be mechanical buttons or electrostatic buttons. The buttons 250 may provide additional functionality including "left click" and "right click" functions similar to those of a computer mouse but not limited thereto. The buttons 250 of the stylus pen 200 may be coupled to a pen control unit (CPU) 260. The buttons 250 may be mechanical, electrical, capacitive, or other types known to those skilled in the art.

The button processing unit 252 converts a button signal provided from the buttons 250 into a digital signal and provides the digital signal to the pen control unit 260.

The pen pressure sensor 206 senses a pressure applied to the touch panel by the stylus pen 200 and provides a sensed pressure signal to the pen pressure processing unit 207.

The pen pressure processing unit 207 provides a pressure signal provided from the pen pressure sensor 206 to the waveform driving unit 280.

The pen control unit 260 may control an operation of components provided in the stylus pen 200.

The power managing unit 270 supplies the power of the battery 272 to the respective components. The power supply is boosted as needed, and the boosted power supply is supplied to the respective components. Conventionally, a stylus pen may be classified into an active type and a passive type according to the presence or absence of a battery. According to the present invention, since the battery 272 is provided in the stylus pen 200, the stylus pen according to the present invention is an active stylus pen.

The waveform generating unit 280 provides the waveform driving unit 290 with a first waveform for generating a position sensing signal SPO or a second waveform for generating a pressure sensing signal SPR in response to a control of the pen control unit 260. The first waveform or the second waveform may be a sinusoidal wave.

The waveform driving unit 290 amplifies the first waveform or the second waveform generated by the waveform generating unit 280, mixes the amplified waveforms, and outputs the mixed signal. In the present exemplary embodiment, a pen pressure processing unit 207, a waveform generating unit 280 and a waveform driving unit 290 may define the frequency signal generator 208 shown in FIG. 3.

Figure 5:
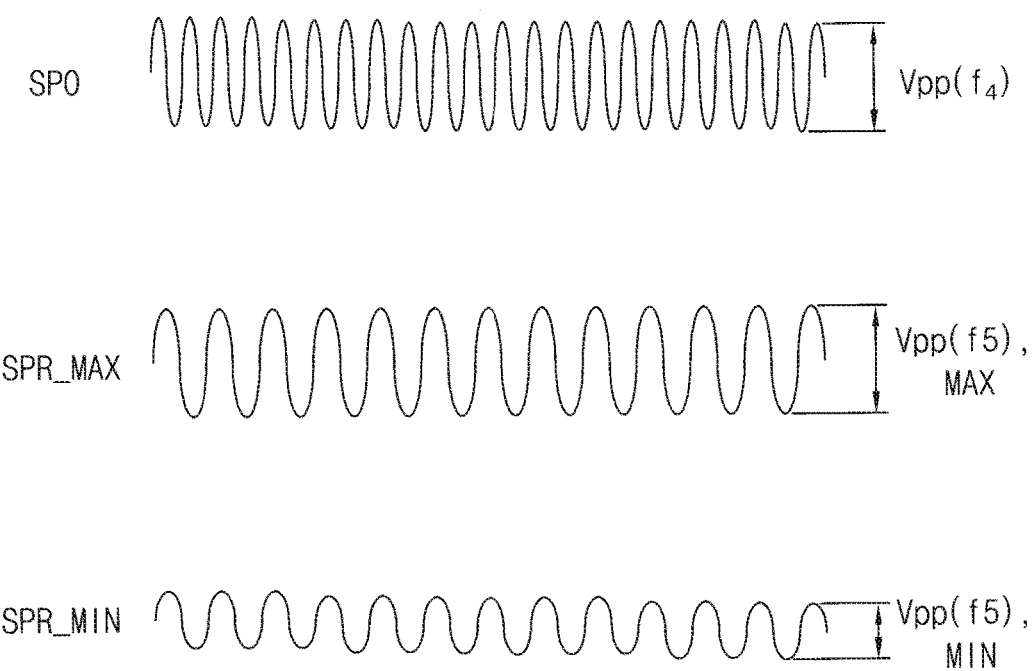
FIG. 5 is waveform diagrams illustrating an example of a position sensing signal and a pressure sensing signal output from the stylus pen shown in FIG. 1.

FIG. 5 is waveform diagrams illustrating an example of a position sensing signal SPO and a pressure sensing signal SPR output from the stylus pen shown in FIG. 1.

Referring to FIG. 5, a fifth frequency component f4 of a position sensing signal SPO is set differently from the first to fourth frequency components f0, f1, f2 and f3 of the driving signal provided to the driving electrodes of the touch panel. Moreover, a sixth frequency component f5 of the pressure sensing signal SPR is set differently from the first to fourth frequency components f0, f1, f2 and f3 of the driving signal provided to the driving electrodes of the touch panel. Moreover, a fifth frequency component f4 of the position sensing signal SPO and a sixth frequency component f5 of the pressure detection signal SPR are set differently from each other.

The position sensing signal SPO has a fixed frequency and a fixed amplitude.

The pressure sensing signal SPR has a fixed frequency and a variable amplitude. An amplitude of the pressure sensing signal SPR may vary according to a pen pressure signal corresponding to a pressure applied to a stylus pen. For example, a pressure sense signal SPR having the maximum amplitude may be outputted when a high pen pressure signal is detected, and a pressure sense signal SPR having the minimum amplitude may be outputted when a low pen pressure signal is detected.

Meanwhile, the amplitude of the pressure sensing signal SPR may vary according to a button that can be operated by a user. The button may be provided in a stylus pen, and the amplitude of the pressure sensing signal SPR may be varied in accordance to the button.

Figure 6:
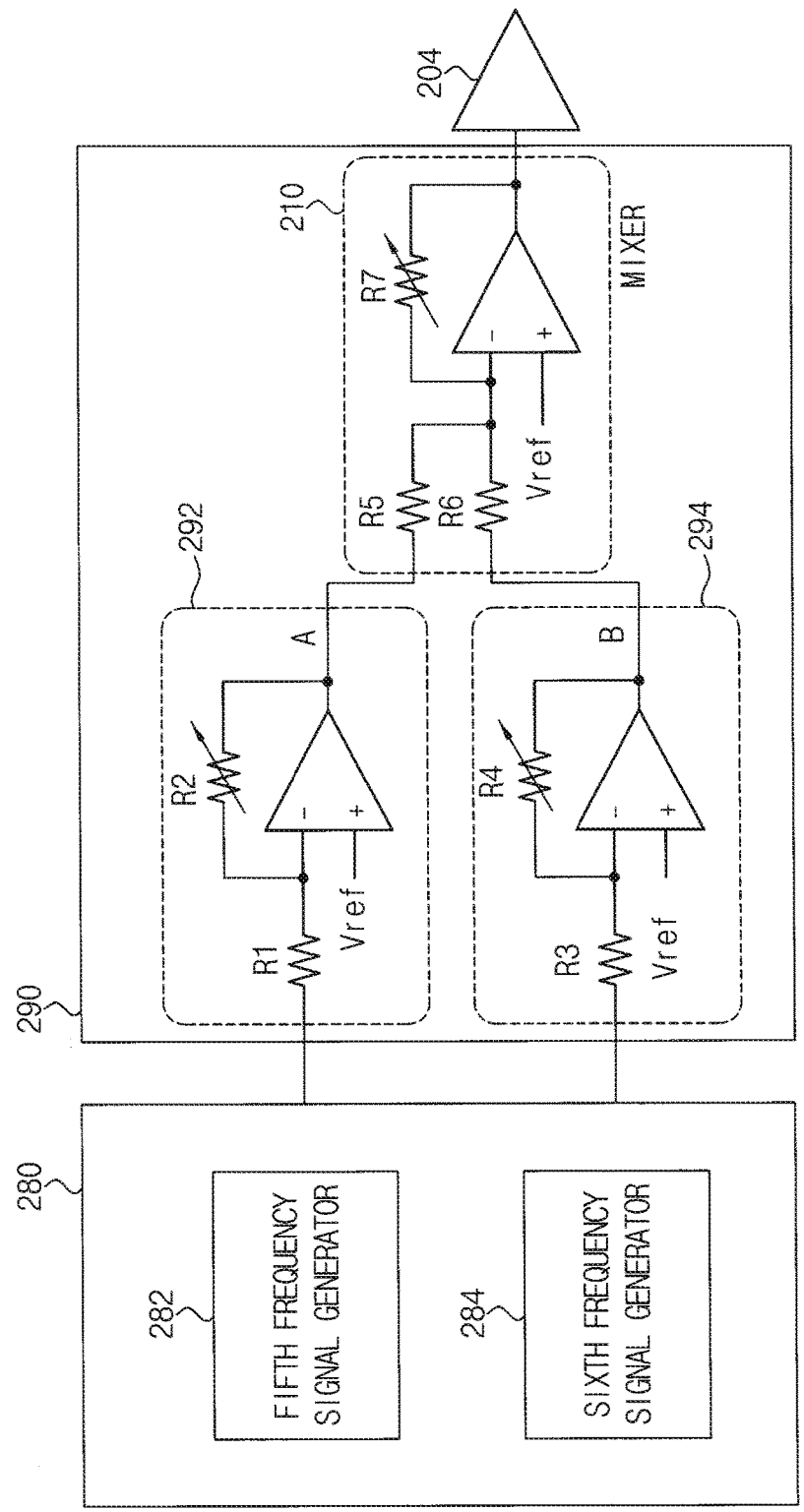
FIG. 6 is a circuit diagram illustrating an example of the stylus pen shown in FIG. 1.

FIG. 6 is a circuit diagram illustrating an example of the stylus pen shown in FIG. 1.

Referring to FIG. 6, a waveform generating unit 280 includes a fifth frequency signal generator 282 and a sixth frequency signal generator 284, and a waveform driving unit 290 includes a first amplifying unit 292, a second amplifying unit 294, a mixer 210 and a conductive tip 204.

The first amplifying unit 292 includes a first resistor R1, a second resistor R2 and a first operational amplifier OP1. A first terminal of the first resistor R1 receives a position sensing signal SPO and a second terminal of the first resistor R1 is connected to an inverting terminal of the first operational amplifier OP1. A first terminal of the second resistor R2 is connected to the second terminal of the first resistor R1 and the inverting terminal of the first operational amplifier OP1, and a second terminal of the second resistor R2 is connected to the mixer 210. The second resistor R2 may be a variable resistor. The inverting terminal of the first operational amplifier OP1 is connected to the second terminal of the first resistor R1 and the first terminal of the second resistor R2, and a non-inverting terminal of the first operational amplifier OP1 is connected to a reference voltage Vref.

The second amplifying unit 294 includes a third resistor R3, a fourth resistor R4 and a second operational amplifier OP2. A first terminal of the third resistor R3 receives a position sensing signal SPO and the second terminal of the third resistor R3 is connected to an inverting terminal of the second operational amplifier OP2. A first terminal of the fourth resistor R4 is connected to the second terminal of the third resistor R3 and the inverting terminal of the second operational amplifier OP2, and a second terminal of the fourth resistor R4 is connected to the mixer 210. The fourth resistor R4 may be a variable resistor. An inverting terminal of the second operational amplifier OP2 is connected to a second terminal of the third resistor R3 and a first terminal of the fourth resistor R4, and a non-inverting terminal of the second operational amplifier OP2 is connected to the reference voltage Vref.

The mixer 210 includes a fifth resistor R5, a sixth resistor R6, a third operational amplifier OP3 and a seventh resistor R7. A first terminal of the fifth resistor R5 is connected to an output terminal of a first amplifying unit, and a second terminal of the fifth resistor R5 is connected to an inverting terminal of the third operational amplifier OP3. A first terminal of the sixth resistor R6 is connected to an output terminal of the second amplifying unit, and a second terminal of the sixth resistor R6 is connected to an inverting terminal of the third operational amplifier OP3. The seventh resistor R7 is connected to an inverting terminal and an output terminal of the third operational amplifier OP3. An inverting terminal of the third operational amplifier OP3 is connected to the second terminal of the fifth resistor R5 and the second terminal of the sixth resistor R6, and a non-inverting terminal of the third operational amplifier OP3 is connected to the reference voltage Vref.

In the foregoing specification, it has been described that the position sensing signal SPO and the pressure sensing signal SPR are generated separately, and the generated signals are amplified and then mixed to provide a pen frequency signal to the conductive tip.

Figure 7:
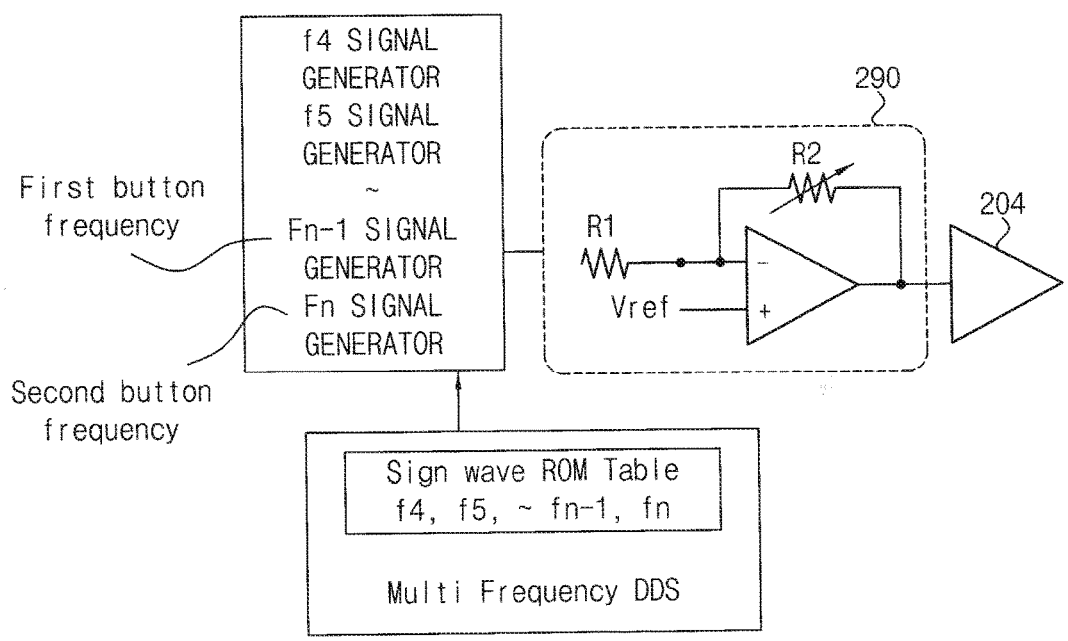
FIG. 7 is a circuit diagram illustrating another example of the stylus pen shown in FIG. 1.

FIG. 7 is a circuit diagram illustrating another example of the stylus pen shown in FIG. 1;

Referring to FIG. 7, a waveform generating unit 280 may include a digital function generator that provides a sinusoidal wave to the waveform driver 290. The digital function generator may include a plurality of direct digital synthesis (hereinafter, "DDS") modules configured to precisely generate a sinusoidal wave of a precise frequency, period, and phase in response to control of the pen control unit 260 (shown in FIG. 4).

Each of the DDS modules may generate a plurality of frequency signals. For example, a position sensing signal SPO having a fifth frequency component f4 and a pressure sensing signal SPR having a sixth frequency component f5 may be generated. Moreover, a signal having a frequency component fn−1, a signal having a frequency component fn, or the like may be generated. Here, the signal having the frequency component fn−1 may be a frequency component corresponding to a first button provided to the stylus pen, and the signal having the frequency component fn may correspond to a second button provided to the stylus pen.

The waveform driving unit 290 includes a first resistor R1, a second resistor R2 and a first operational amplifier OP1. A first terminal of the first resistor R1 receives a sinusoidal signal from the waveform generating unit 280, and a second terminal of the first resistor R1 is connected to an inverting terminal of the first operational amplifier OP1. A first terminal of the second resistor R2 is connected to the second terminal of the first resistor R1 and the inverting terminal of the first operational amplifier OP1, and a second terminal of the second resistor R2 is connected to the conductive tip 204. The second resistor R2 may be a variable resistor. The inverting terminal of the first operational amplifier OP1 is connected to the second terminal of the first resistor R1 and a first terminal of the second resistor R2, and a non-inverting terminal of the first operational amplifier OP1 is connected to the reference voltage Vref.

Figure 8A:
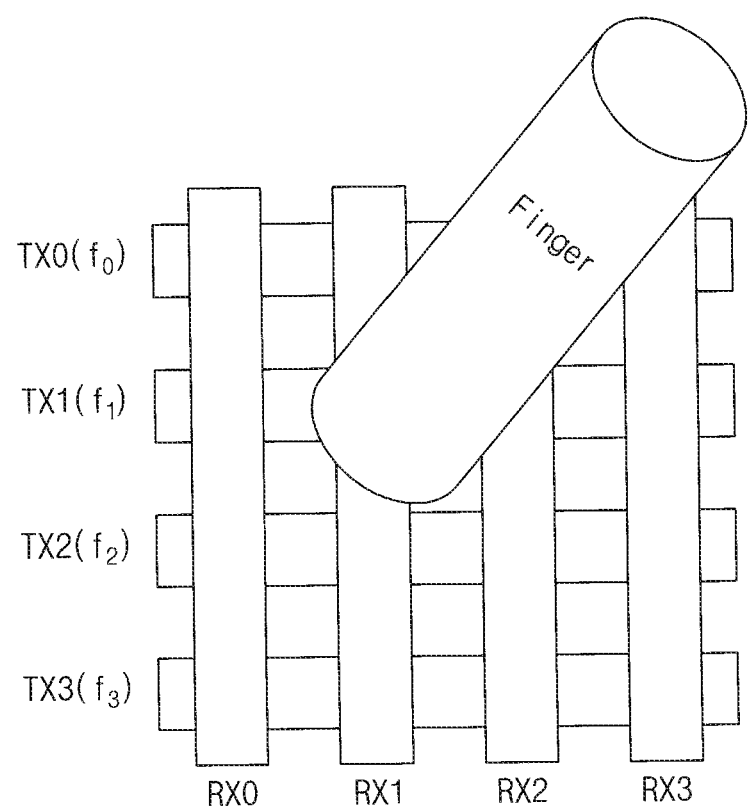
FIG. 8A is a schematic diagram of a touch panel illustrating a touch by a finger.
Figure 8B:
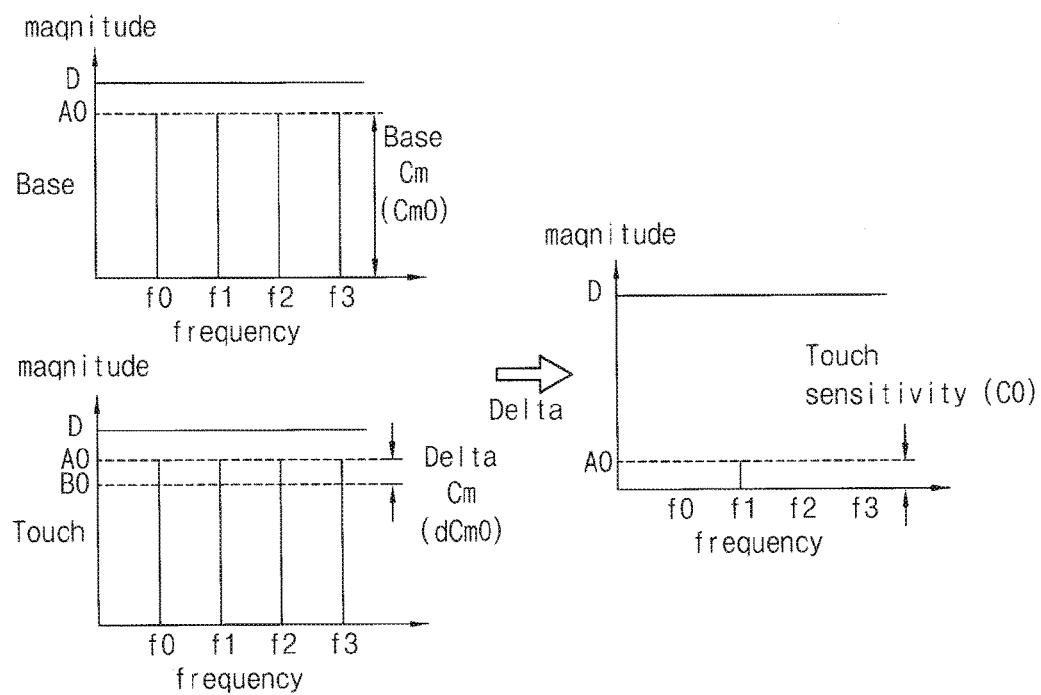
FIG. 8B is a waveform diagram illustrating a touch coordinate recognition through a frequency spectrum analysis of a sensing signal by a finger touch.

FIG. 8A is a schematic diagram of a touch panel illustrating a touch by a finger, and FIG. 8B is a waveform diagram illustrating a touch coordinate recognition through a frequency spectrum analysis of a sensing signal by a finger touch.

Referring to FIG. 8A, a first driving electrode TX0, a second driving electrode TX1, a third driving electrode TX2 and a fourth driving electrode TX3 are arranged in a horizontal direction on a touch panel, and a first sensing electrode RX0, a second sensing electrode RX1, a third sensing electrode RX2 and a fourth sensing electrode RX3 are arranged in the longitudinal direction on the touch panel. The first to fourth driving electrodes TX0, TX1, TX2 and TX3 are arranged in a lower area of the touch panel and the first to fourth sensing electrodes RX0, RX1, RX2 and RX3 are arranged in an upper area of the touch panel.

A first driving signal STX0, a second driving signal STX0, a third driving signal STX2 and a fourth driving signal STX3 are applied to the first driving electrode TX0, the second driving electrode TX1, the third driving electrode TX2 and the fourth driving electrode TX3, respectively. First to fourth sensing signals SRX0, SRX1, SRX2 and SRX3 corresponding to the applied driving signals STX0, STX1, STX2 and STX3 are received through a first sensing electrode RX0, a second sensing electrode RX1, a third sensing electrode RX2 and a fourth sensing electrode RX3, respectively. The received sensing signals are subjected to FFT processing to determine touch coordinates.

Referring to FIG. 8B, a sensing signal received through a second sensing electrode RX1 is subjected to FFT processing.

In the case of a base state in which there is no touch operation, the FFT-processed sensing signal has a first frequency component f0, a second frequency component f1, a third frequency component f2 and a fourth frequency component f3. Here, the amplitudes of the first to fourth frequency components f0, f1, f2 and f3 are equal to each other.

When a finger touches an area where the second driving electrode TX1 intersects with the second sensing electrode RX1, the FFT-processed sensing signal has a first frequency component f0, a second frequency component f1, a third frequency component f2 and a fourth frequency component f3. In this case, the amplitudes of the first frequency component f0, the third frequency component f2 and the fourth frequency component f3 are substantially equal to each other. The amplitude of the second frequency component f1 is smaller than the amplitude of the first frequency component f0.

When a waveform of a finger touch state is subtracted from a waveform of a base state, the second frequency component f1 only remains. The amplitude of the second frequency component f1 remaining after the subtraction may correspond to a finger touch sensitivity.

Therefore, since the second frequency component f1 is detected corresponding to the second sensing electrode RX1, the second driving electrode TX1 delivering a second driving signal STX1 having the second frequency component f1 and the second sensing electrode RX1 are detected as touch coordinates of a finger.

Figure 9A:
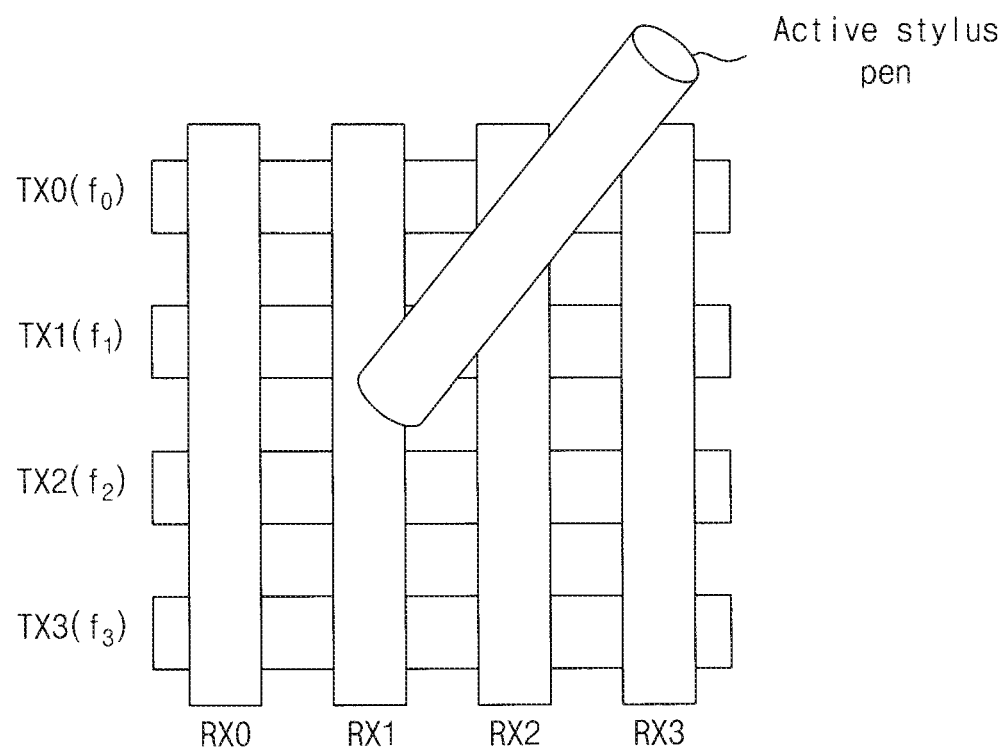
FIG. 9A is a schematic diagram of a touch panel illustrating a touch by a stylus pen.

FIG. 9A is a schematic diagram of a touch panel illustrating a touch by a stylus pen, and FIG. 9B is a waveform diagram illustrating touch coordinate recognition through frequency spectrum analysis of a sensing signal by a stylus pen.

Since the touch panel shown in FIG. 9A has been described with reference to FIG. 8B, a description thereof will be omitted.

Referring to FIG. 9B, a sensing signal received through a second sensing electrode RX1 is FFT-processed.

In the case of a base state in which there is no touch operation, the FFT-processed sensing signal has a first frequency component f0, a second frequency component f1, a third frequency component f2 and a fourth frequency component f3. Here, the amplitudes of the first to fourth frequency components f0, f1, f2 and f3 are equal to each other.

When a stylus pen touches a region where the second driving electrode TX1 intersect with the second sensing electrode RX1, the FFT-processed sensing signal has a first frequency component f0, a second frequency component f1, a third frequency component f2, a fourth frequency component f3, a fifth frequency component f5 and a sixth frequency component f6. In this case, the amplitudes of the first to fourth frequencies f0, f1, f2 and f3 are substantially equal to each other. The amplitude of the fifth frequency component f5 is smaller than the amplitude of the first frequency component f0. The amplitude of the sixth frequency component f6 is smaller than the amplitude of the first frequency component f0. The amplitude of the sixth frequency component f6 is smaller than the amplitude of the fifth frequency component f5.

When a waveform of a stylus pen touch state is subtracted from a waveform of the base state, the fifth frequency component f5 and the sixth frequency component f6 only remain. The amplitude of the fifth frequency component f5 remaining after the subtraction may correspond to a touch sensitivity of a stylus pen. Moreover, the amplitude of the sixth frequency component f6 remaining after the subtraction may correspond to a pen pressure sensitivity of the stylus pen.

Thus, since the fifth frequency component f5 is detected corresponding to the second sensing electrode RX1, it may be confirmed that a stylus pen is disposed on the second sensing electrode RX1. Therefore, the second sensing electrode RX1 is detected as a first axis coordinate (e.g., X coordinate) of the stylus pen.

The touch coordinates by the stylus pen may be recognized in the above-described manner, and a more detailed description will be described with reference to FIGS. 11A to 13 described later.

Figure 10A:
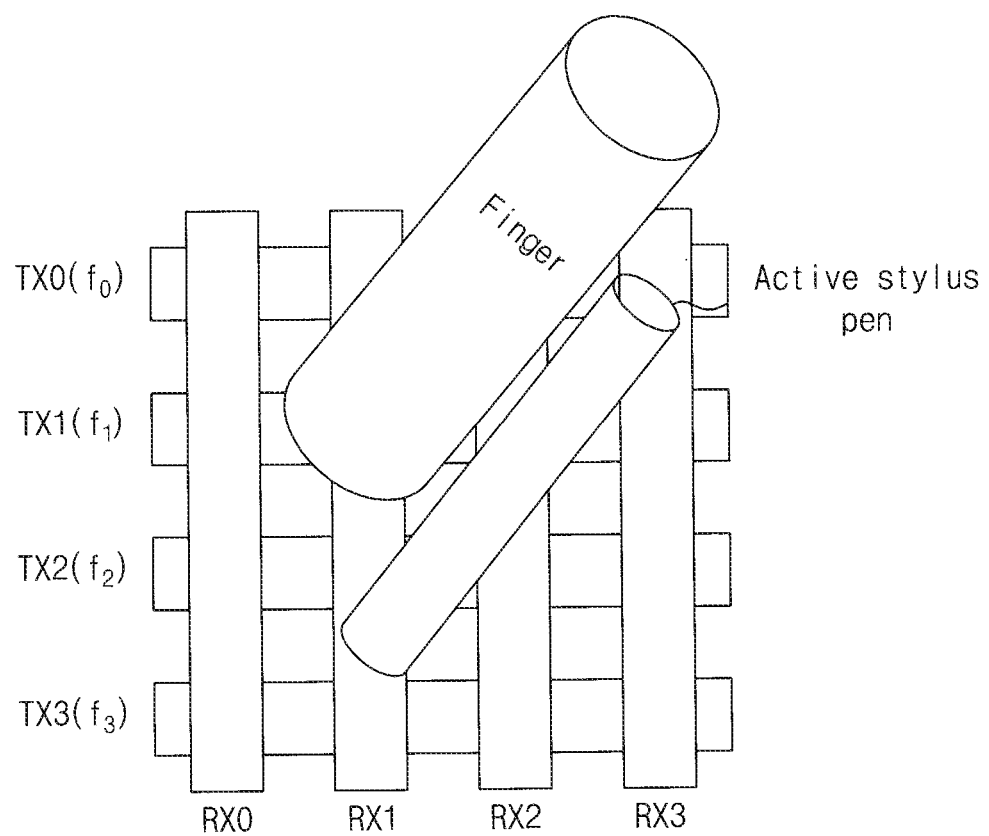
FIG. 10A is a schematic diagram of a touch panel illustrating a touch by a finger and a stylus pen.
Figure 10B:
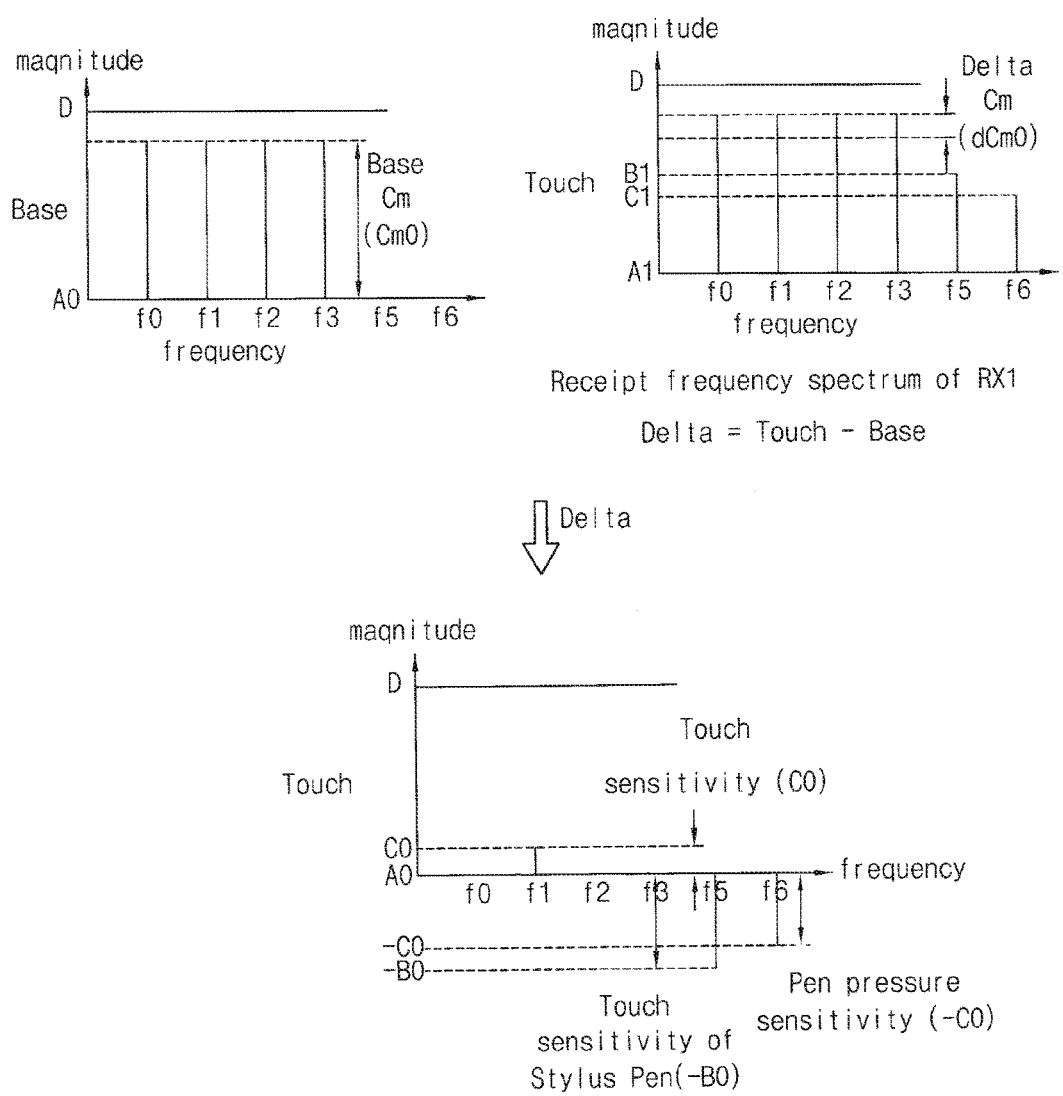
FIG. 10B is a waveform diagram illustrating touch coordinate recognition through a frequency spectrum analysis of a sensing signal by a finger and a stylus pen.

FIG. 10A is a schematic diagram of a touch panel illustrating a touch by a finger and a stylus pen, and FIG. 10B is a waveform diagram illustrating touch coordinate recognition through a frequency spectrum analysis of a sensing signal by a finger and a stylus pen.

Since the touch panel shown in FIG. 10A has been described with reference to FIG. 8B, a description thereof will be omitted.

Referring to FIG. 10B, a sensing signal received through a second sensing electrode RX1 is FFT-processed.

In the case of a base state in which there is no touch operation, the FFT-processed sensing signal has a first frequency component f0, a second frequency component f1, a third frequency component f2 and a fourth frequency component f3. Here, the amplitudes of the first to fourth frequency components f0, f1, f2 and f3 are equal to each other.

When a finger touches an area where the second driving electrode TX1 intersects with the second sensing electrode RX1 and a stylus pen touches an area where the third driving electrode TX2 intersects with the second sensing electrode RX1, the FFT-processed sensing signal has a first frequency component f0, a second frequency component f1, a third frequency component f2, a fourth frequency component f3, a fifth frequency component f5 and a sixth frequency component f6. In this case, the amplitudes of the first frequency component f0, the third frequency component f2 and the fourth frequency component f3 are substantially equal to each other. The amplitude of the second frequency component f1 is smaller than the amplitude of the first frequency component f0. The amplitude of the fifth frequency component f5 is smaller than the amplitude of the first frequency component f0. The amplitude of the sixth frequency component f6 is smaller than the amplitude of the first frequency component f0. The amplitude of the sixth frequency component f6 is smaller than the amplitude of the fifth frequency component f5.

When a waveform of a mixed state is subtracted from a waveform of the base state, the second frequency component f1, the fifth frequency component f5 and the sixth frequency component f6 only remain. The amplitude of the second frequency component f1 remaining after the subtraction may correspond to a finger touch sensitivity. Moreover, the amplitude of the fifth frequency component f5 remaining after the subtraction may correspond to a touch sensitivity of the stylus pen. Moreover, the amplitude of the sixth frequency component f6 remaining after the subtraction may correspond to a pen pressure sensitivity of the stylus pen.

Thus, since the second frequency component f1 is detected corresponding to the second sensing electrode RX1, the second driving electrode TX1 delivering a second driving signal STX1 having the second frequency component f1 and the second sensing electrode RX1 are detected as touch coordinates of a finger. Moreover, since the fifth frequency component f5 is detected corresponding to the second sensing electrode RX1, it may be confirmed that a stylus pen is disposed on the second sensing electrode RX1. Therefore, the second sensing electrode RX1 is detected as a first axis coordinate of the stylus pen.

The touch coordinates by the finger and the touch coordinates by the stylus pen may be recognized in the above-described manner, and a more detailed description will be described with reference to FIGS. 11A to 13 described later.

Figure 11A:
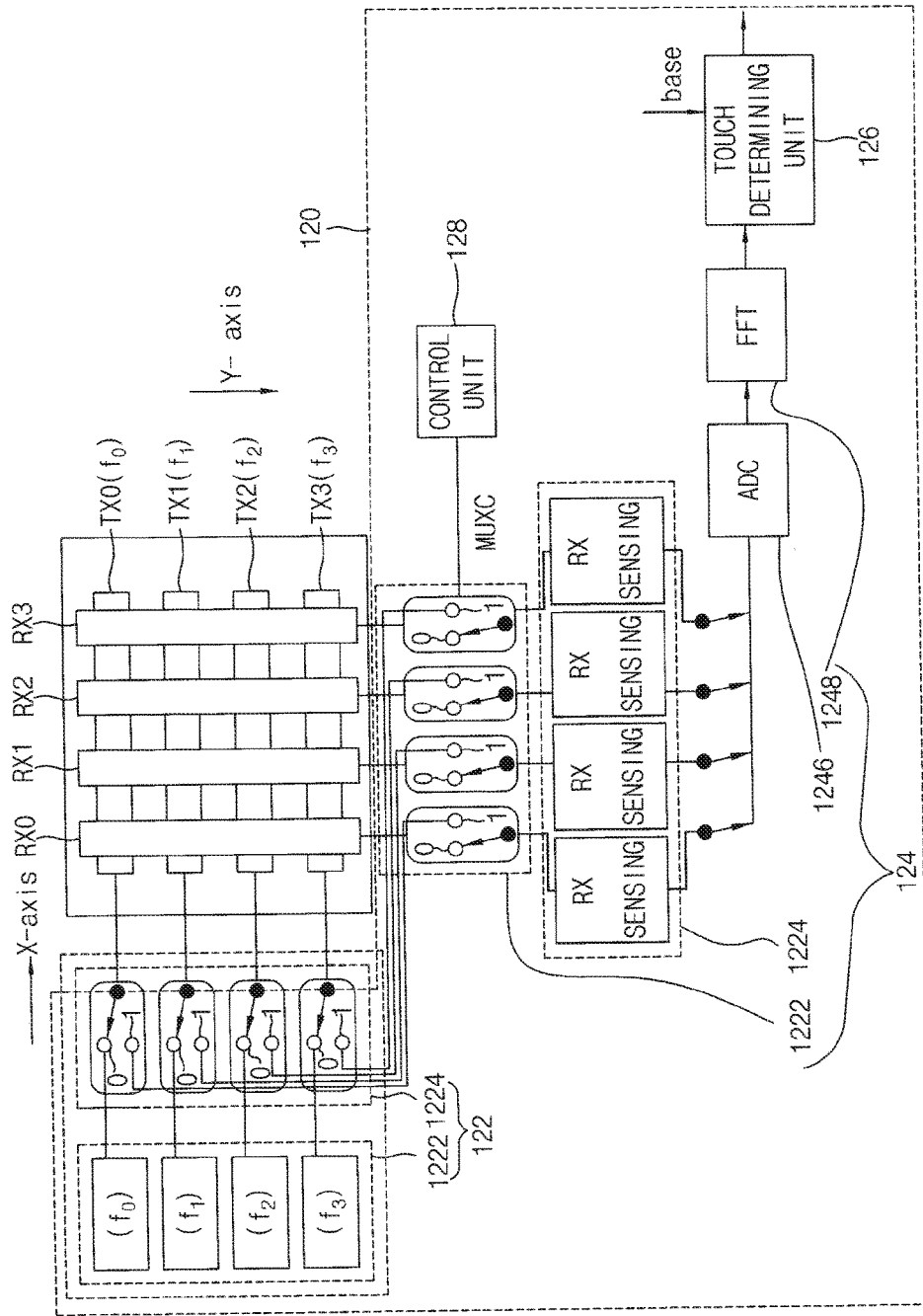
FIG. 11A and FIG. 11B are configuration diagrams of a touch sensing device illustrating a touch coordinates recognition of a finger and a stylus pen.
Figure 11B:
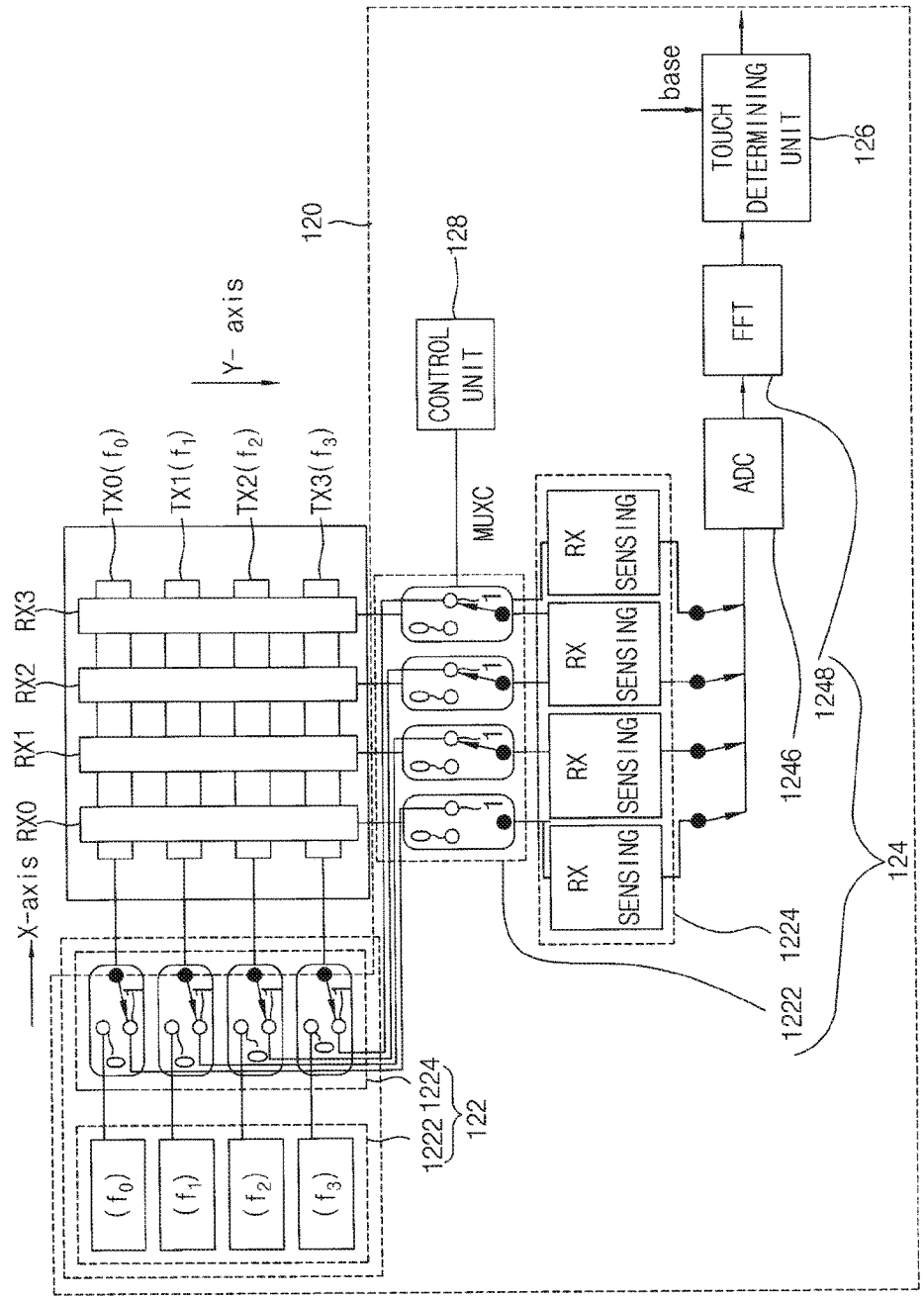

FIG. 11A and FIG. 11B are configuration diagrams of a touch sensing device illustrating a touch coordinates recognition of a finger and a stylus pen. In particular, FIG. 11A is a configuration diagram of a touch sensing device illustrating a sensing of a finger coordinates, a X-coordinate of a stylus pen and a pen pressure information of the stylus pen, and FIG. 11B is a configuration diagram of a touch sensing device illustrating a sensing of a Y-coordinate of a stylus pen and a pen pressure information of the stylus pen.

FIG. 11A and FIG. 11B, a touch panel 110 includes a first driving electrode TX0, a second driving electrode TX1, a third driving electrode TX2 and a fourth driving electrode TX1 arranged in a horizontal direction, and includes a first sensing electrode RX0, a second sensing electrode RX1, a third sensing electrode RX2 and a fourth sensing electrode RX3 arranged in a longitudinal direction. For convenience of explanation, it is shown that a touch panel 110 of a 4×4 matrix in which four driving electrodes and four sensing electrodes are disposed.

In the touch panel 110, the driving electrodes are orthogonally arranged to intersect with and overlap each of the sensing electrodes. Thus, each driving electrode is capacitively coupled to each of the sensing electrodes. For example, the second driving electrode TX1 is capacitively coupled to the second sensing electrode RX1 at a point where the second driving electrode TX1 and the second sensing electrode RX1 are overlapped with each other. The intersections of the driving electrodes and the sensing electrodes form a capacitive sensing element, respectively.

Due to a capacitive coupling between the driving electrode and the sensing electrodes, supplying a driving signal at each driving electrode may induce a current in each of the sensing electrodes. For example, when a driving signal is applied to a second driving electrode TX1, a driving signal induces a sensing signal on a second sensing electrode RX1 in the touch panel 110. Then, the sensing signal on each of the sensing electrodes may be sequentially measured by using a multiplexer in order to sequentially connect each of the sensing electrodes to a demodulation circuit. A capacitance associated with each intersection point between a driving electrode and a sensing electrode may be sensed by selecting each available combination of a driving electrode and a sensing electrode.

When a touch object such as a finger or a stylus approaches the touch panel 110, the object causes a reduction of capacitance, which affects only a part of the electrodes. For example, when a finger is positioned near an intersection of a second driving electrode TX1 and a second sensing electrode RX1, a presence of the finger reduces a coupling capacitance between the second driving electrode TX1 and the second sensing electrode RX1. In another exemplary embodiment, the presence of the finger increases the coupling capacitance between the second driving electrode TX1 and the second sensing electrode RX1. Thus, a position of a finger on the touch panel 110 may be determined by identifying a sensing electrode having a reduced coupling capacitance between the sensing electrode and the driving electrode to which the driving signal is applied when the reduced capacitance is measured on the sensing electrode. Thus, the capacitances associated with each intersection of the electrodes in the touch panel 110 are sequentially determined, so that positions of one or more inputs may be determined.

In the present exemplary embodiment, although the driving electrodes and sensing electrodes are shown as bars or elongated rectangles, alternative embodiments may be used to form a variety of mosaic shapes such as a diamond shape, a square shape, a gull shape, and other available shapes.

The touch sensing controller 120 outputs a plurality of driving signals having different frequency components to the touch panel 110 and determines at least one of touch coordinates of a finger and touch coordinates of a stylus pen based on the plurality of sensing signals provided from the touch panel 110. The touch sensing controller 120 may be implemented as one or a plurality of chips.

The touch sensing controller 120 includes a touch driving unit 122, a touch sensing unit 124, a touch determining unit 126 and a touch control unit 128.

The touch driving unit 122 is connected to driving electrodes TX0, TX1, TX2 and TX3 of the touch panel 110 that are in contact with a stylus pen that outputs a pen frequency signal set to detect a position of the stylus pen and a pressure of the stylus pen. The touch driving unit 122 outputs the driving signals to the driving electrodes TX0, TX1, TX2 and TX3.

The touch driving unit 122 includes a transmission signal generating part 1222 and a transmission multiplexing part 1224. The transmission signal generating part 1222 includes a plurality of transmission signal generators generating driving signals having different frequency components.

The transmission multiplexing part 1224 includes a plurality of transmission multiplexers having a first transmission input terminal (0) connected to the transmission signal generator, a second transmission input terminal (1) connected to the touch sensing unit 124 and a transmission output terminal connected to the driving electrode. The first transmission input terminal is connected to the transmission output terminal or the second transmission input terminal is connected to the transmission output terminal in response to a multiplexer control signal MUXC provided from the touch control unit 128.

The touch sensing unit 124 is connected to sensing electrodes RX0, RX1, RX2 and RX3 of the touch panel 110 to receive the sensing signals through the sensing electrodes RX0, RX1, RX2 and RX3.

The touch sensing unit 124 includes a reception multiplexing part 1242, a reception sensing part 1244, an analog-to-digital converting part 1246 and a fast Fourier transform part 1248.

The reception multiplexing part 1242 includes a plurality of reception multiplexers having a reception output terminal, a first reception input terminal (0) connected to the sensing electrode and a second reception connection terminal (1) connected to a second transmission input terminal (1) of a transmission multiplexing part 1224 of the touch driving unit 122. In response to the multiplexer control signal MUXC, the first reception input terminal is connected to the reception output terminal or the second reception input terminal is connected to the reception output terminal.

The reception sensing part 1244 includes a plurality of reception sensors connected to a reception output terminal of the reception multiplexers.

The analog-to-digital converting part 1246 digitally converts the sensing signals received through the reception sensors to provide the converted signals to the fast Fourier transform part 1248. The analog-to-digital converting part 1246 performs the ADC conversion at a frequency at least two times faster than the driving frequency.

The fast Fourier transform part 1248 performs fast Fourier transform each of the digitally converted sensing signals to convert each of the sensing signals into a frequency domain in a time domain. The fast Fourier transform part 1248 obtains a frequency component and the magnitude of the frequency component to provide the frequency component and the magnitude of the frequency component to the touch determining unit 126. In the present exemplary embodiment, by converting the sensing in the time domain into the sensing in the frequency domain, it is very useful for digital signal processing.

The touch determining unit 126 determines at least one of touch coordinates of a finger, touch coordinates of a stylus pen and a pen pressure information of the stylus pen based on a variation amount between frequency amplitudes of the fast Fourier-transformed sensing signal based on a frequency amplitude of a driving signal.

The touch control unit 128 controls an operation of the touch driving unit 122 such that driving signals having different frequency components are simultaneously supplied to the driving electrodes.

The touch control unit 128 provides information about a frequency of the driving signal to the analog-to-digital converting part 1246 so that the analog-to-digital converting part 1246 converts a frequency of the driving signal to a frequency faster than the frequency of the driving signal.

In the present embodiment, the touch sensing controller 120 may further include one or more memory devices (not shown) for storing measured sizes and associated parameters, and a microprocessor (not shown) for performing the necessary computation and control functions.

In order to perform one or more of the functions described herein, other portions of the touch sensing controller 120 and/or the touch sensing device 100 may be realized as one or more application-specific integrated circuits (ASICs), application-specific standard product (ASSP) or the like.

In operation, as shown in FIG. 11A, in response to the multiplexer control signal MUXC, first input terminals (0) of the transmission multiplexers and the driving electrodes are connected to each other and first input terminals (0) the reception multiplexers and the reception sensing part 1244 are connected to each other, so that a touch coordinates of the finger, a first axis coordinate of the stylus pen and a pen pressure information of the stylus pen are sensed. In FIG. 11A, since the sensing electrodes RX0, RX1, RX2 and RX3 are arranged along a X-axis, a first axis coordinate of the stylus pen is a X coordinate.

Moreover, as shown in FIG. 11B, in response to the multiplexer control signal MUXC, second input terminals (1) of the transmission multiplexers and the driving electrode are connected to each other and second input terminal (1) of the reception multiplexers and reception sensing part 1244 are connected to each other, so that a second axis coordinate of the stylus pen and a pen pressure information of the stylus pen are sensed. In FIG. 11B, since the driving electrodes TX0, TX1, TX2 and TX3 are arranged along a Y-axis, a second axis coordinate of the stylus pen is a Y coordinate.

As described above, the touch sensing controller 120 outputs a plurality of driving signals having different frequency components to the touch panel 110 and determines at least one of touch coordinates of a finger and touch coordinates of a stylus pen based on the sensing signals received at the touch panel 110, so that the touch recognition may be realized at the same time.

Figure 12:
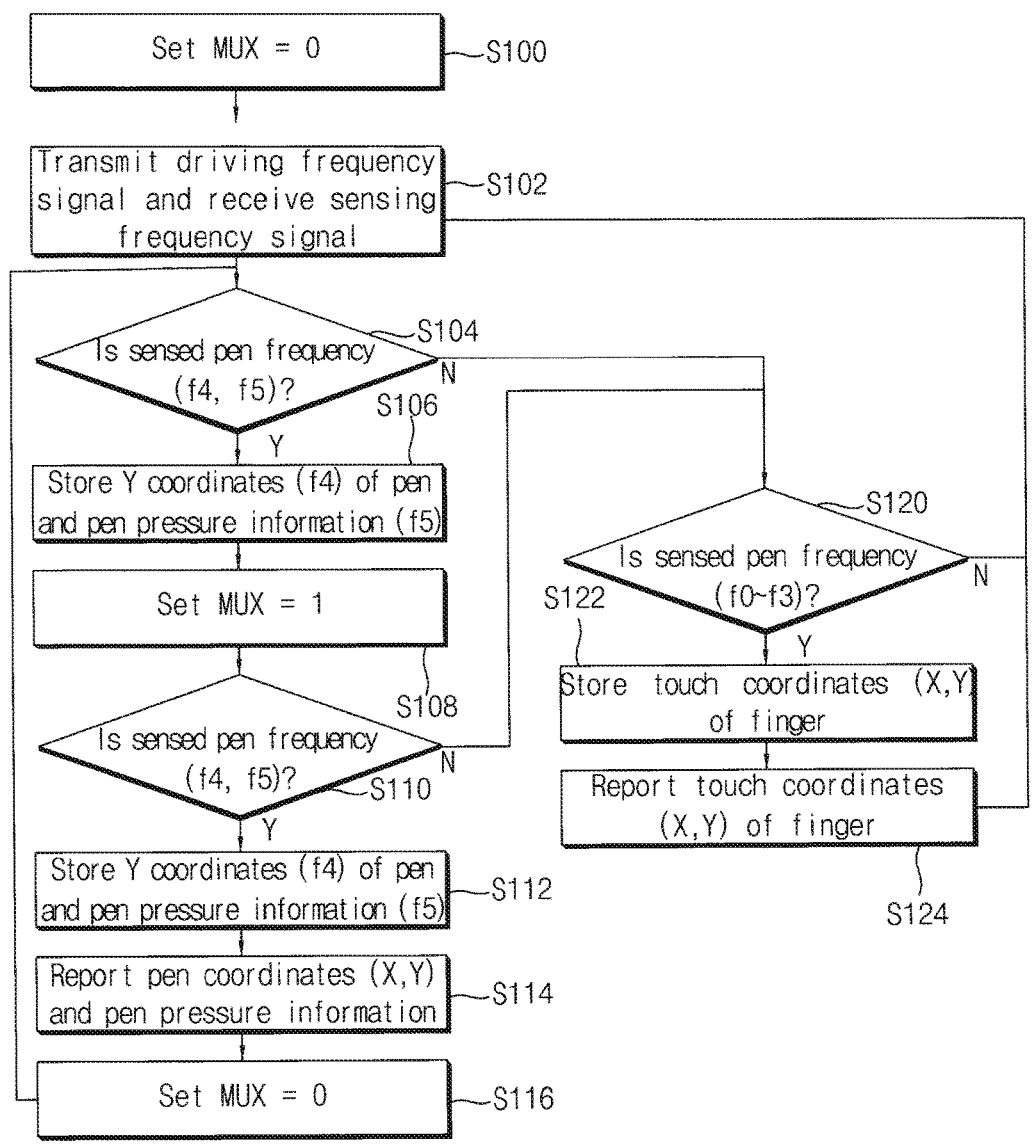
FIG. 12 is a flowchart illustrating a touch coordinate recognition method in which the finger and the stylus pen are individually recognized in the touch sensing device shown in FIG. 11A and FIG. 11B.

FIG. 12 is a flowchart illustrating a touch coordinate recognition method in which the finger and the stylus pen are individually recognized in the touch sensing device shown in FIG. 11A and FIG. 11B.

Referring to FIG. 11A, FIG. 11B and FIG. 12, the multiplexer is set to 0 (step S100). That is, first transmission input terminals (0) of the transmission multiplexers included in the transmission multiplexing part 1224 and the driving electrodes TX0, TX1, TX2 and TX3 are connected to each other, and first reception input terminals (0) of reception multiplexers included in the reception multiplexing part 1242 and the sensing electrodes RX0, RX1, RX2 and RX3 are connected to each other.

Then, the driving signals are transmitted to the driving electrodes TX0, TX1, TX2 and TX3, and the sensing signals are received through the sensing electrodes RX0, RX1, RX2 and RX3 (step S102).

Then, it is checked whether or not the pen frequency component is detected by fast Fourier transforming the sensing signals (step S104). The pen frequency component includes pen X-axis position information (e.g., the fifth frequency component f4) and pen pressure information (e.g., the sixth frequency component f5).

When it is checked that the pen frequency components f4 and f5 are sensed in step S104, the pen X-axis position information (e.g., the fifth frequency component f4) is stored and the pen pressure information of the pen (e.g., the sixth frequency component f5) is stored (step S106).

Then, the multiplexer is set to 1 (step S108). That is, the second transmission input terminal (1) of the transmission multiplexers included in the transmission multiplexing part 1224 and the driving electrodes TX0, TX1, TX2 and TX3 are connected to each other, and the second reception input terminal (1) of the reception multiplexers included in the reception multiplexing part 1242 and the sensing electrodes RX0, RX1, RX2 and RX3 are connected to each other.

Then, the sensing signals received through the sensing electrodes RX0, RX1, RX2 and RX3 are FFT-processed to check whether or not the pen frequency components f4 and f5 are sensed (step S110).

When it is checked that the pen frequency components f4 and f5 are sensed in step S110, the pen Y-axis position information f4 is stored and the pen pressure information f5 is stored (step S112).

Then, the pen coordinate (X, Y) and the pen pressure information are reported (step S114). The pen coordinate (X, Y) is the pen X-axis position information f4 stored in step S106 and the pen Y-axis position information f4 stored in step S112. The pen pressure information f5 of the pen may be the pen pressure information f5 of the pen stored in step S106 or the pen pressure information f5 of the pen stored in step S112.

Then, after the multiplexer is set to 0 (step S116), it is fed back to step S104. That is, the first transmission input terminal (0) of the transmission multiplexers included in the transmission multiplexing part 1224 and the driving electrodes TX0, TX1, TX2 and TX3 are connected to each other, and it is fed back to step S104 after connecting the first reception input terminal (0) of the reception multiplexers included in the reception multiplexing part 1242 and the sensing electrodes RX0, RX1, RX2 and RX3 to each other.

Meanwhile, when it is checked that the pen frequency components f4 and f5 are not sensed in step S104, RX sensing is performed (that is, a FFT processing) to check whether or not the transmission frequency components f0 to f3 are sensed (step S120).

When it is checked that the transmission frequency components f0, f1, f2 and f3 are not sensed in step S120, it is fed back to step S102. When it is checked that the transmission frequency components f0, f1, f2 and f3 are sensed in step S120, the touch coordinates of a finger is stored (step 122), and the stored finger coordinates is reported (step S124).

Figure 13:
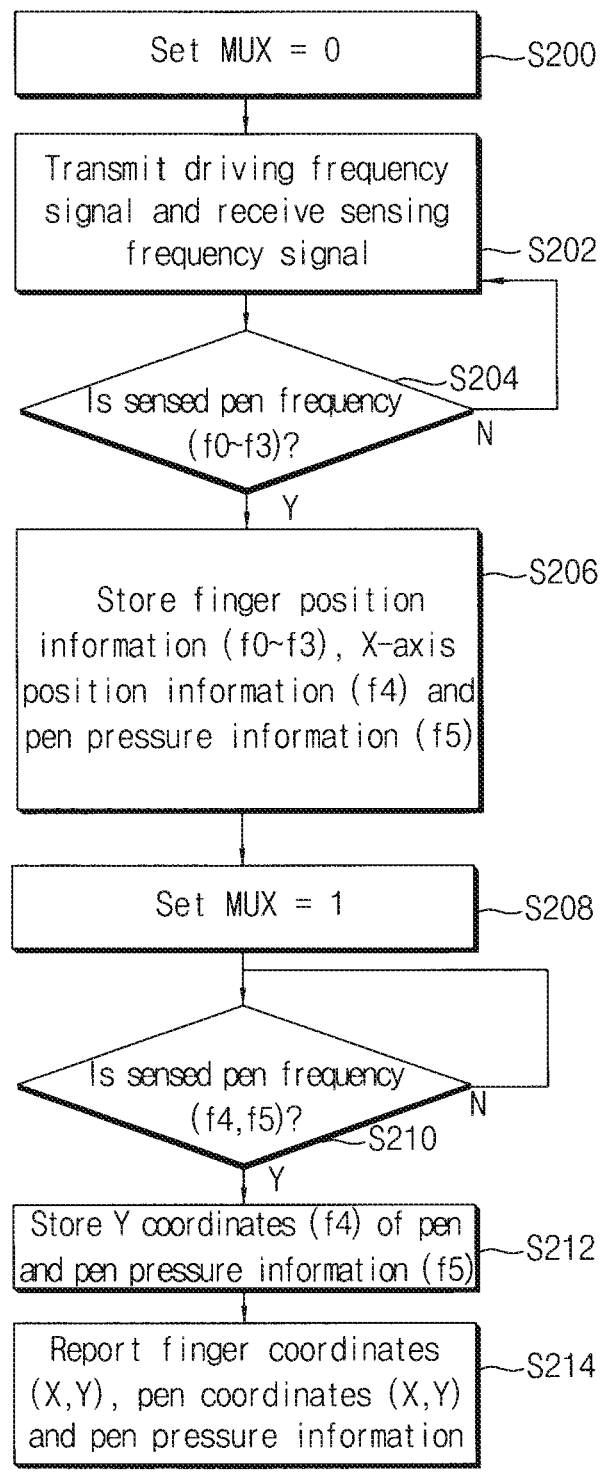
FIG. 13 is a flowchart illustrating a touch coordinate recognition method in which the finger and the stylus pen are simultaneously recognized in the touch sensing device shown in FIG. 11A and FIG. 11B.

FIG. 13 is a flowchart illustrating a touch coordinate recognition method in which the finger and the stylus pen are simultaneously recognized in the touch sensing device shown in FIG. 11A and FIG. 11B.

Referring to FIG. 11A, FIG. 11B and FIG. 13, the multiplexer is set to 0 (step S200). That is, the first transmission input terminal (0) of the transmission multiplexers included in the transmission multiplexing part 1224 and the driving electrodes TX0, TX1, TX2 and TX3 are connected to each other, and the first reception input terminal (0) of the reception multiplexers included in the reception multiplexing part 1242 and the sensing electrodes RX0, RX1, RX2 and RX3 are connected to each other.

Then, the driving signals are transmitted to the driving electrodes TX0, TX1, TX2 and TX3, and the sensing signals are received through the sensing electrodes RX0, RX1, RX2 and RX3 (step S202).

Then, it is checked whether or not the pen frequency components f0, f1, f2, f3, f4 and f5 are sensed by fast Fourier transforming the sensing signals (step S204).

When it is checked that the pen frequency components f0 to f5 are not sensed in step S204, it is fed back to step S202.

When it is checked that the pen frequency components f0, f1, f2, f3, f4 and f5 are sensed in step S204, the pen X-axis position information f4 is stored and the pen pressure information f5 is stored (step S206).

Then, the multiplexer is set to 1 (step S208). That is, the second transmission input terminal (1) of the transmission multiplexers included in the transmission multiplexing part 1224 and the driving electrodes TX0, TX1, TX2 and TX3 are connected to each other, and the second reception input terminal (1) of the reception multiplexers included in the reception multiplexing part 1242 and the sensing electrodes RX0, RX1, RX2 and RX3 are connected to each other.

Then, the sensing signals received through the sensing electrodes RX0, RX1, RX2 and RX3 are FFT-processed to check whether or not the pen frequency components f4 and f5 are sensed (step S210).

When it is checked that the pen frequency components f4 and f5 are sensed in step S210, the pen Y-axis position information f4 is stored and the pen pressure information f5 is stored (step S212).

Then, finger coordinate information, pen coordinate information and pen pressure information are reported (step S214), and then it is feedback to step S200. The finger coordinate (X,Y) information is the pen X-axis coordinate stored at step S206 and the pen Y-axis coordinate stored at step S212. The pen pressure information may be the pen pressure information f5 stored in step S206 or the pressure information f5 stored in step S212.

Although the operations of the method(s) herein are shown and described in a particular order, the operations of each method may be varied such that certain operations may be performed in reverse order, or that a particular operation may be performed at least partially concurrently with other operations. In other exemplary embodiments, the instructions or sub-actions of the individual operations may be intermittent and/or alternate.

Having described exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A touch system comprising:
    a touch panel comprising a plurality of driving electrodes and a plurality of sensing electrodes;
    a stylus pen providing the touch panel with a pen frequency signal set for detecting a position of the stylus pen and a pressure of the stylus pen; and
    a touch sensing controller comprising a touch sensing unit connected to the sensing electrodes to receive sensing signals through the sensing electrodes, outputting a plurality of driving signals having different frequency components to the touch panel and determining at least one of touch coordinates of a finger and touch coordinates of the stylus pen based on a plurality of sensing signals received from the touch panel,
    wherein the touch sensing unit comprises:
    a reception multiplexing part comprising a plurality of reception multiplexers having a reception output terminal, a first reception input terminal connected to a sensing electrode and a second reception input terminal connected to a second transmission input terminal of a transmission multiplexing part of a touch driving unit, wherein the first reception input terminal is connected to the reception output terminal or the second reception input terminal is connected to the reception output terminal in response to a multiplexer control signal provided from an external device;
    a reception sensing part comprising a plurality of reception sensors connected to a reception output terminal of the reception multiplexers;

an analog-to-digital converting part digitally converting the sensing signals received through the reception sensors; and a fast Fourier transform part Fourier-transforming the sensing signals digitally converted by the analog-to-digital conversion part, wherein the touch sensing controller further comprises:

a touch driving unit connected to the driving electrodes to output the driving signals to the driving electrodes; and a touch determining unit determining at least one of the touch coordinates based on the sensing signals received through the touch sensing unit, wherein the touch driving unit comprises:

a transmission signal generating part comprising a plurality of transmission signal generators generating different driving signals; and a transmission multiplexing part comprising a plurality of transmission multiplexers having a first transmission input terminal connected to the transmission signal generator, a second transmission input terminal connected to the touch sensing unit, and an output terminal connected to the driving electrodes, wherein the first transmission input terminal is connected to the transmission output terminal or the second transmission input terminal is connected to the output terminal in response to the multiplexer control signal.

2. The touch system of claim 1, wherein the pen frequency signal set is a mixture of a position sensing signal set for sensing the position of the stylus pen and a pressure sensing signal set for sensing the pressure of the stylus pen.

3. The touch system of claim 2, wherein the position sensing signal set and the driving signals have different frequency components.

4. The touch system of claim 2, wherein the pressure sensing signal set and the driving signals have different frequency components.

5. The touch system of claim 1, wherein the driving signals is simultaneously output to the touch panel.

6. A touch system comprising:

a touch panel comprising a plurality of driving electrodes and a plurality of sensing electrodes;

a stylus pen providing the touch panel with a pen frequency signal set for detecting a position of the stylus pen and a pressure of the stylus pen; and a touch sensing controller comprising a touch sensing unit connected to the sensing electrodes to receive sensing signals through the sensing electrodes, outputting a plurality of driving signals having different frequency components to the touch panel and determining at least one of touch coordinates of a finger and touch coordinates of the stylus pen based on a plurality of sensing signals received from the touch panel, wherein the touch sensing unit comprises:

a reception multiplexing part comprising a plurality of reception multiplexers having a reception output terminal, a first reception input terminal connected to a sensing electrode and a second reception input terminal connected to a second transmission input terminal of a transmission multiplexing part of a touch driving unit, wherein the first reception input terminal is connected to the reception output terminal or the second reception input terminal is connected to the reception output terminal in response to a multiplexer control signal provided from an external device;

a reception sensing part comprising a plurality of reception sensors connected to a reception output terminal of the reception multiplexers;

an analog-to-digital converting part digitally converting the sensing signals received through the reception sensors; and a fast Fourier transform part Fourier-transforming the sensing signals digitally converted by the analog-to-digital conversion part, wherein, in response to the multiplexer control signal, first input terminals of the transmission multiplexers and the driving electrodes are connected to each other, and first input terminals of the reception multiplexers and the receive sensing part are connected to each other, so that touch coordinates of the finger, a first axis coordinates of the stylus pen and a pen pressure information of the stylus pen are sensed.

7. A touch system comprising:

a touch panel comprising a plurality of driving electrodes and a plurality of sensing electrodes;

a stylus pen providing the touch panel with a pen frequency signal set for detecting a position of the stylus pen and a pressure of the stylus pen; and a touch sensing controller comprising a touch sensing unit connected to the sensing electrodes to receive sensing signals through the sensing electrodes, outputting a plurality of driving signals having different frequency components to the touch panel and determining at least one of touch coordinates of a finger and touch coordinates of the stylus pen based on a plurality of sensing signals received from the touch panel, wherein the touch sensing unit comprises:

a reception multiplexing part comprising a plurality of reception multiplexers having a reception output terminal, a first reception input terminal connected to a sensing electrode and a second reception input terminal connected to a second transmission input terminal of a transmission multiplexing part of a touch driving unit, wherein the first reception input terminal is connected to the reception output terminal or the second reception input terminal is connected to the reception output terminal in response to a multiplexer control signal provided from an external device;

a reception sensing part comprising a plurality of reception sensors connected to a reception output terminal of the reception multiplexers;

an analog-to-digital converting part digitally converting the sensing signals received through the reception sensors; and a fast Fourier transform part Fourier-transforming the sensing signals digitally converted by the analog-to-digital conversion part wherein, in response to the multiplexer control signal, second input terminals of the transmission multiplexers and the driving electrodes are connected to each other, and second input terminals of the reception multiplexers and the receive sensing part are connected to each other, so that a second axis coordinate of the stylus pen and a pen pressure information of the stylus pen are sensed.

* * * * *